United States Patent
Shimizu et al.

(10) Patent No.: US 7,282,718 B2
(45) Date of Patent: Oct. 16, 2007

(54) INORGANIC SCINTILLATOR AND PROCESS FOR ITS FABRICATION

(75) Inventors: Shigenori Shimizu, Tsukuba (JP); Kazuhisa Kurashige, Hitachinaka (JP); Tatsuya Usui, Hitachinaka (JP); Naoaki Shimura, Hitachinaka (JP); Hiroyuki Ishibashi, Hitachinaka (JP); Keiji Sumiya, Tsukuba (JP); Kenzou Susa, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 60 days.

(21) Appl. No.: 11/220,743

(22) Filed: Sep. 8, 2005

(65) Prior Publication Data

US 2006/0054831 A1 Mar. 16, 2006

(30) Foreign Application Priority Data

Sep. 15, 2004 (JP) ............ P2004-268604

(51) Int. Cl.
*G01T 1/20* (2006.01)

(52) U.S. Cl. .............................. 250/370.11

(58) Field of Classification Search ........... 250/370.11, 250/361 R, 362; 252/301.4, 301.4 F See application file for complete search history.

(56) References Cited

U.S. PATENT DOCUMENTS

| | | | | |
|---|---|---|---|---|
| 5,264,154 A | * | 11/1993 | Akiyama et al. | 252/301.4 F |
| 6,278,832 B1 | * | 8/2001 | Zagumennyi et al. | 385/141 |
| 6,706,212 B2 | * | 3/2004 | Venkataramani et al. | 252/301.4 F |
| 7,166,845 B1 | * | 1/2007 | Chai | 250/361 R |

FOREIGN PATENT DOCUMENTS

JP 64-65482 3/1989

OTHER PUBLICATIONS

C.C. Melcher et al., "Scintillation Properties of GSO", IEEE Transactions on Nuclear Science, vol. 37, No. 2, Apr. 1990, pp. 161-164.
D.R. Schaart et al., "Properties and Mechanism of Scintillation in $CsGd_2F_7:Ce^{3+}$ and $CsY_2F_7:Ce^{3+}$ Crystals", Journal of Physics.: Condensed Matter 7 (1995) pp. 3063-3088.

\* cited by examiner

*Primary Examiner*—David Porta
*Assistant Examiner*—Djura Malevic
(74) *Attorney, Agent, or Firm*—Antonelli, Terry, Stout & Kraus, LLP.

(57) ABSTRACT

This invention provides an inorganic scintillator capable of producing scintillation by radiation, which is a crystal comprising metal oxides including Lu, Gd, Ce and Si, which satisfies the condition specified by the following inequality (1A):

$$0.0025 \leq \{A_{Ce}/(A_{Lu}+A_{Gd})\} \leq 0.025, \quad (1A)$$

and which has an absorption coefficient of no greater than 0.500 cm$^{-1}$ for light with a wavelength of 415 nm.

16 Claims, 3 Drawing Sheets

INORGANIC SCINTILLATOR AND PROCESS FOR ITS FABRICATION

BACKGROUND OF THE INVENTION

1. Field of the Invention

The present invention relates to an inorganic scintillator and to a process for its fabrication.

2. Related Background of the Invention

In an apparatus used for Positron Emission (computed) Tomography (hereinafter, "PET"), a massive scintillator is mounted for highly efficient detection of 511 keV γ rays emitted from a specimen injected with a radioactive agent. The optical characteristics (wavelength conversion characteristics, etc.) of the scintillator mounted in the PET apparatus have a major effect on the imaging performance of the apparatus, and therefore improvement in the optical characteristics of the scintillator is the most important means of enhancing the imaging performance of such apparatuses. Researchers are therefore actively exploring scintillator materials which can be used to construct scintillators with excellent optical characteristics, and are developing manufacturing techniques such as crystal growth techniques for realizing such scintillators.

In the field of high-energy physics as well, experiments for detection and analysis of high-energy microparticles arriving to earth from outer space require implementation of scintillators which allow efficient detection of high-energy microparticles.

Scintillators mounted in PET apparatuses must exhibit various aspects of performance including a large time-integrated value for the outputted scintillation pulse intensity (hereinafter, "scintillation output"), short scintillation rise times and scintillation decay times, high energy resolution and high density. Particularly for higher efficiency detection of γ rays emitted from subjects being examined by PET, it is preferred for scintillators to produce a greater scintillation output. Also from the standpoint of alleviating the burden on subjects, the examination time per subject must be shortened and therefore scintillators with short scintillation decay times are desired.

The time-dependent change in the intensity of a scintillation pulse outputted upon incidence of a radiation into a scintillator will now be explained. FIG. 1 is a graph which schematically illustrates typical time-dependent change in the intensity of a scintillation pulse. The scintillation pulse rises relatively precipitously to the maximum intensity value $I_{max}$ and gradually decays thereafter. Throughout the present specification, "scintillation output" refers to the time-integrated value of the scintillation pulse intensity from the time at which the scintillation pulse intensity (scintillation intensity) is at $I_{max}$ ($t_{max}$) to the time at which scintillation is no longer observed (the shaded section in FIG. 1). Also, "scintillation decay time" refers to the time required from the maximum value of the scintillation pulse intensity ($I_{max}$) during the rising stage of the outputted scintillation pulse to $I_{max}/e$ (where e represents the base of the natural logarithm).

Inorganic scintillators made of inorganic materials are currently employed as scintillators for PET, and as examples there may be mentioned those employing $Bi_4Ge_3O_{12}$ (hereinafter "BGO"), $Gd_2SiO_5$ (hereinafter, "GSO") and $Lu_2SiO_5$ (hereinafter, "LSO") as matrix materials. BGO is used in a PET apparatus (trade name: "Discovery") by GE Healthcare Corp., GSO is used in a PET apparatus (trade name "ALLEGRO") by Philips Medical Systems, and LSO is used in a PET apparatus (trade name: "ECAT ACCEL") by Siemens Corp.

The scintillation output for scintillation produced upon incidence of a radiation to the scintillator, as one of the luminescent properties of these inorganic scintillators, is a relative value of 2.0 for GSO and 4.0 for LSO with respect to 1.0 for BGO. The scintillation decay time is approximately 300 ns for BGO, approximately 60 ns for GSO and approximately 40 ns for LSO. GSO and LSO which exhibit superior optical characteristics among these inorganic scintillators have structures wherein Ce has been added as a luminescent center in a matrix material composed of the aforementioned rare earth element-containing metal oxides It is known that among inorganic scintillators having structures wherein Ce has been added as a luminescent center in a matrix material composed of a rare earth element-containing metal oxide, inorganic scintillators which employ Gd-containing metal oxides tend to have two or more scintillation components exhibiting different scintillation decay times (see, for example, IEEE Transactions Nuclear Science, Vol. 37, No. 2 (1990) 161 and Journal of Physics: Condensed Matter 7(1995) 3063). In addition, it has been demonstrated that the scintillation decay times of the scintillation components tend to be shorter when the value of the total number of Ce atoms in the scintillator divided by the total number of rare earth element atoms (hereinafter, "Ce content ratio") is high (see, for example, Japanese Patent Application Laid-Open No. 64-65482).

A method for resolving scintillation components when the inorganic scintillator includes two scintillation components with different scintillation decay times will now be explained.

When the outputted scintillation pulse comprises two scintillation components with different scintillation decay times as mentioned above, the scintillation intensity I is represented by the following formula (A).

$$I = I_{max}(ae^{-(t-t_{max})/\tau_1} + (1-a)e^{-(t-t_{max})/\tau_2}) \quad (A)$$

In formula (A), I is the scintillation intensity, a is a variable, $t_{max}$ is the time at which the scintillation intensity is $I_{max}$, t is the time elapsed from $t_{max}$, τ1 is the longer scintillation decay time and τ2 is the shorter scintillation decay time. $I_{max}$ is as defined above.

In formula (A), the term represented by formula (B) below is the scintillation intensity $I_1$ at time t for the scintillation component with the longer scintillation decay time, and the term represented by formula (C) below is the scintillation intensity $I_2$ at time t for the scintillation component with the shorter scintillation decay time. Based on these formulas, the scintillation output $I_{1in}$ for the scintillation component with the longer scintillation decay time and the scintillation output $I_{2in}$ for the scintillation component with the shorter scintillation decay time are represented by the following formulas (D) and (E), respectively.

$$I_1 = I_{max}ae^{-(t-t_{max})/\tau_1} \quad (B)$$

$$I_2 = I_{max}(1-a)e^{-(t-t_{max})/\tau_2} \quad (C)$$

$$I_{1in} = I_{max}a\int_{t_{max}}^{\infty} e^{-(t-t_{max})/\tau_1} \quad (D)$$

$$I_{2in} = I_{max}(1-a)\int_{t_{max}}^{\infty} e^{-(t-t_{max})/\tau_2} \quad (E)$$

FIG. 2 is a graph schematically showing typical time-dependent change in the intensity of a scintillation pulse comprising two scintillation components with different scintillation decay times. The curve shown as the alternate dot-dash line (b) represents the time-dependent change in the scintillation intensity $I_1$, the curve shown as the dash-dot-dot line (c) represents the time-dependent change in the scintillation intensity $I_2$, and the curve shown as the solid line (a) represents the time-dependent change in the scintillation intensity I.

The waveform of the obtained scintillation pulse (solid line (a) in FIG. 2) may be fitted into formula (A) above for resolution into each of the scintillation components. In this case, the fitting is performed using the least square method, optimizing a, τ1 and τ2.

Thus, in order to shorten the scintillation decay time of an inorganic scintillator using a Gd-containing metal oxide as the matrix, it is sufficient to increase the Ce content ratio. Yet, Nuclear Instruments and Methods in Physics Research A404 (1998) 283, for example, teaches that a higher Ce content ratio in an inorganic scintillator tends to result in reduced scintillation output from the inorganic scintillator.

SUMMARY OF THE INVENTION

As mentioned above, the desirable optical characteristics of a scintillator are a large scintillation output and a short scintillation decay time. However, as clearly indicated by the disclosures in above-mentioned documents, it is difficult for inorganic scintillators having the structures described above to simultaneously exhibit the required optical properties by simple adjustment of the Ce content ratio. Detailed investigation by the present inventors of such conventional inorganic scintillator structures, beyond the publications mentioned above, has led to the conclusion that inorganic scintillators having such structures cannot provide adequately high scintillation output with sufficiently short scintillation decay times.

The present invention has been accomplished in light of these circumstances, and its object is to provide an inorganic scintillator having a structure wherein Ce is added as a luminescent center to a matrix material made of a Gd-containing metal oxide, wherein the inorganic scintillator has a sufficiently high scintillation output with a sufficiently short scintillation decay time.

The invention provides an inorganic scintillator capable of producing scintillation by radiation, characterized by being a crystal comprising metal oxides including Lu, Gd, Ce and Si, by satisfying the condition specified by the following inequality (1A):

$$0.0025 \leq \{A_{Ce}/(A_{Lu}+A_{Gd})\} \leq 0.025 \quad (1A),$$

and by having an absorption coefficient of no greater than 0.500 cm$^{-1}$ for light with a wavelength of 415 nm. In inequality (1A), $A_{Lu}$ represents the number of Lu atoms in the crystal, $A_{Gd}$ represents the number of Gd atoms in the crystal, and $A_{Ce}$ represents the number of Ce atoms in the crystal. Throughout the present specification, Si is also considered to be included among the "metals" of the "metal oxides".

The inorganic scintillator is obtained by a process for fabrication of an inorganic scintillator according to the invention, which process comprises steps of growing a crystal by a single crystal growth method to obtain a single crystal ingot for construction of the inorganic scintillator, and heating the ingot.

The inorganic scintillator of the invention, having a Ce content ratio within the range prescribed by inequality (1A) above, is capable of exhibiting a sufficiently short scintillation decay time for an inorganic scintillator. In addition, the inorganic scintillator of the invention can realize an adequately high scintillation output even with a high enough Ce content ratio to adequately shorten the scintillation decay time. This is because the absorption coefficient is adjusted to be no greater than 0.500 cm$^{-1}$ for light with a wavelength of 415 nm.

The "absorption coefficient" according to the invention is derived in the following manner. First, the inorganic scintillator is worked into an approximately 10 mm×10 mm×10 mm cuboid to obtain a sample for measurement of the absorption coefficient. The working method is not particularly restricted and maybe molding, cutting or the like. Next, at least one surface of the sample and another surface opposite it are subjected to mechanical polishing to a mirror surface.

The transmittance of the sample obtained by mirror surface working for light of a specific wavelength is then measured using an appropriate apparatus such as a publicly known spectrophotometer (for example, U-3310 by Hitachi High-Technologies). More specifically, for measurement of the transmittance of a sample obtained from a single crystal inorganic scintillator, for example, a spectrophotometer is used for irradiation of light of a specific wavelength normal to one of the mirror surfaces of the single crystal sample. The irradiated light passes through the interior of the single crystal and is emitted from the opposite surface, as the light quantity to be measured. The transmittance $I_{ex}$ (%) is determined as the value of the quantity of light obtained after passing through the interior of the single crystal divided by the quantity of light before passing through the single crystal.

Generally speaking, for two media with different refractive indices, propagation (penetration) of light from one medium to the other medium results in reflection caused by the difference in refractive indices. For example, when light is irradiated from air to a (solid) crystal, the light propagates first from the air to the crystal, and then from the crystal to the air. During this time, a portion of the light is unable to pass through the boundary between the crystal and air, and is reflected at the boundary between the two media. When light of a specific wavelength passes from a medium with a refractive index $n_1$ for that light to a medium with a refractive index $n_2$ for that light, assuming it is irradiated normal to the boundary between the two media, the reflectance R is expressed by the following equation (4), according to the Fresnel formula:

$$R = \{(n_1-n_2)/(n_1+n_2)\}^2 \quad (4).$$

When light with a light quantity of $I_0$ is incident from air normal to the flat surface of a crystal, the light quantity $I_r$ of light emitted to air from the opposite surface parallel to the light-incident surface is represented by the following equation (5A) or (5B):

$$I_r = (I_0-I_0\cdot R)-(I_0-I_0\cdot R)\cdot R+(I_0-I_0\cdot R)\cdot R^2-(I_0-I_0\cdot R)\cdot R^3+ (I_0-I_0\cdot R)\cdot R^4-(I_0-I_0\cdot R)\cdot R^5+ \quad (5A)$$

$$I_r = \Sigma(I_0-I_0\cdot R)\cdot R^{2n}-\Sigma(I_0-I_0\cdot R)\cdot R^{2n+1} (n=0, 1, 2, 3,) \quad (5B)$$

If the 3rd term and onward on the right side of formula (5A) is ignored since they are extremely small values compared to the 1st and 2nd terms, then $I_r$ can be approximated by, instead of formula (5A) above, the following formula (6):

$$I_r = (I_0-I_0\cdot R)-(I_0-I_0\cdot R)\cdot R \quad (6)$$

Also, if $I_0$ is standardized to 1, then formula (6) above is reduced to the following formula (7):

$$I_r = (1 - 1 \cdot R) - (1 - 1 \cdot R) \cdot R \qquad (7)$$

and $I_r$ therefore represents the percentage (%) of light emitted and detected with respect to the incident light.

Based on $I_r$ (%) obtained from formula (7) above and the transmittance $I_{ex}$ (%) obtained from actual measurement of the transmittance, the degree of light μ absorbed inside the crystal is expressed by the following formula (8):

$$\mu = -\{\ln(I_{ex}/I_r)\}/x \qquad (8).$$

Here, x (units: cm) is the perpendicular distance between the light-incident surface of the crystal and the surface opposite it. The degree of light μ absorbed inside the crystal (units: cm$^{-1}$) is defined as the "absorption coefficient" according to the invention.

The inorganic scintillator of the invention preferably also satisfies the condition specified by the following inequality (1B):

$$0.005 \leq \{A_{Ce}/(A_{Lu} + A_{Gd})\} \leq 0.015 \qquad (1B),$$

since this will allow luminescence to be efficiently outputted from the crystal while further shortening the scintillation decay time.

The inorganic scintillator of the invention is also preferably a crystal belonging to monoclinic crystals of the space group C2/c, since the scintillation rise time will be shorter compared to a crystal belonging to the space group P2$_1$/c.

The inorganic scintillator of the invention preferably satisfies the condition specified by the following inequality (2A):

$$0.10 \leq \{A_{Lu}/(A_{Lu} + A_{Gd})\} \leq 0.50 \qquad (2A).$$

Such an inorganic scintillator can shorten the scintillation rise time and further reduce scintillation noise due to Lu which includes a radioactive isotope, compared to a scintillator wherein $\{A_{Lu}/(A_{Lu} + A_{Gd})\}$ is outside of the condition specified by inequality (2A).

The inorganic scintillator of the invention is preferably in the state of a single crystal, since this will allow excellent scintillation properties to be achieved more reliably.

The process for fabrication of an inorganic scintillator according to the invention may include adjustment of, for example, the oxygen partial pressure of the surrounding atmosphere of the ingot, the ambient temperature of the ingot and/or the ingot heating time in the heating step, so that the absorption coefficient of the single crystal is no greater than 0.500 cm$^{-1}$ for light with a wavelength of 415 nm. The process for fabrication of an inorganic scintillator according to the invention may also comprise a step of cooling the ingot after the heating step, as well as a step of cutting the ingot to a prescribed shape and size to obtain the inorganic scintillator.

DESCRIPTION OF THE PREFERRED EMBODIMENTS

Figure 1:
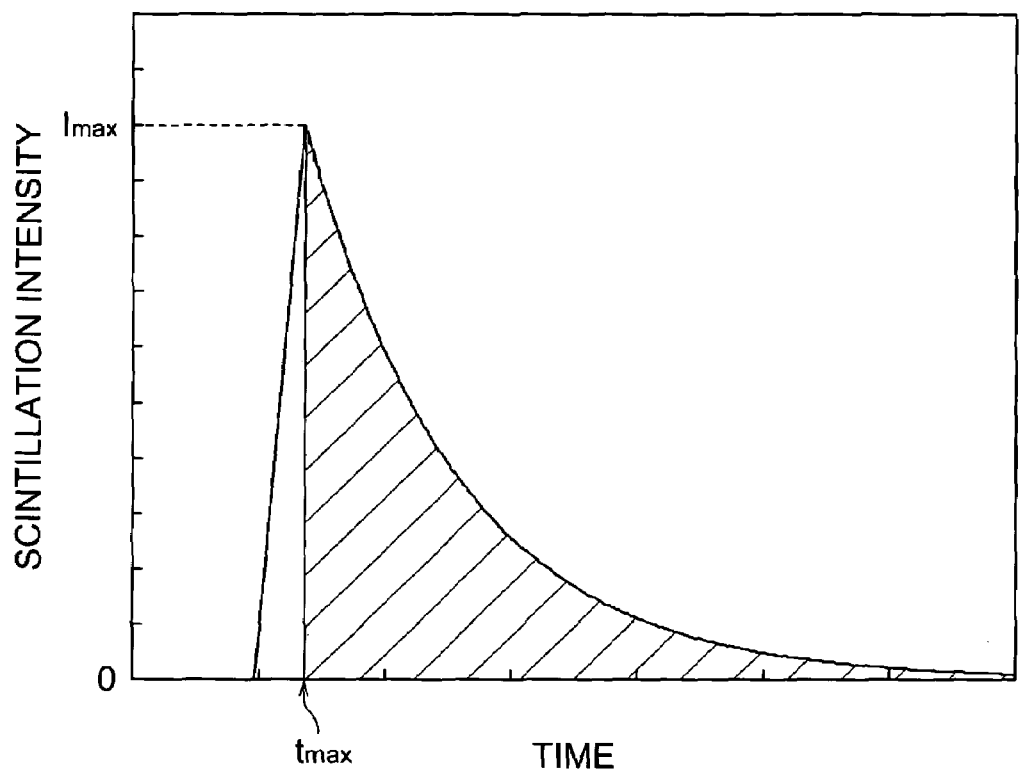
FIG. 1 is a graph schematically showing time-dependent change in intensity of a scintillation pulse outputted from an inorganic scintillator.
Figure 2:
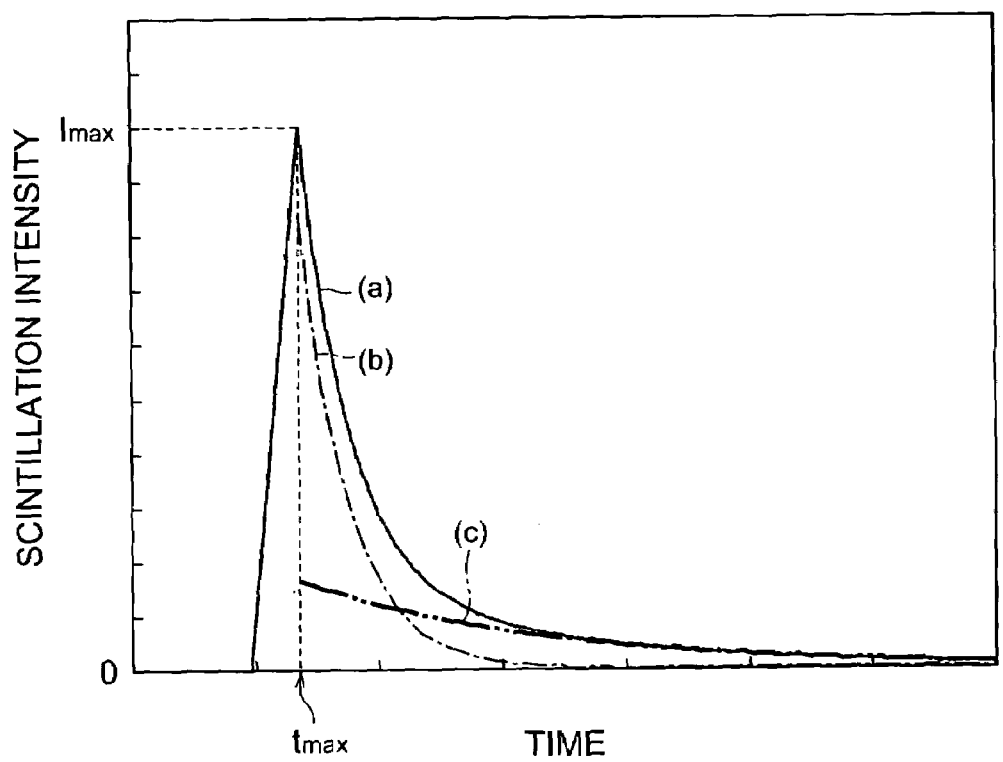
FIG. 2 is a schematic graph illustrating resolution of two scintillation components with different scintillation lifetimes.

Preferred embodiments of the present invention will now be explained in detail with reference to the accompanying drawings as necessary. Throughout the drawings, corresponding elements will be indicated by like reference symbols and will be explained only once. Unless otherwise specified, the vertical and horizontal positional relationships are based on the positional relationships in the drawings. The dimensional proportions in the drawings are not restricted to the proportions shown.

The inorganic scintillator of the invention is an inorganic scintillator capable of producing scintillation by radiation, and it is a crystal comprising metal oxides including Gd and Ce. More preferably, it is an inorganic scintillator containing Lu, Gd, Ce and Si as the metal oxides.

An inorganic scintillator according to a preferred embodiment of the invention is capable of producing scintillation by radiation, comprises metal oxides including Lu, Gd, Ce and Si, is a single crystal belonging to monoclinic crystals of the space group C2/c, and satisfies the condition specified by the following inequality (1A):

$$0.0025 \leq \{A_{Ce}/(A_{Lu} + A_{Gd})\} \leq 0.025 \qquad (1A),$$

In inequality (1A), $A_{Lu}$ represents the number of Lu atoms in the single crystal, $A_{Gd}$ represents the number of Gd atoms in the single crystal, and $A_{Ce}$ represents the number of Ce atoms in the single crystal.

Ce functions mainly as a luminescent center. If the Ce content ratio is adjusted to satisfy the condition specified by inequality (1A), it will be possible to guarantee an adequate degree of light quantity for the scintillator, for use in PET or the like, while sufficiently shortening the scintillation decay time. From the same viewpoint, the inorganic scintillator also preferably satisfies the condition specified by the following inequality (1B):

$$0.005 \leq \{A_{Ce}/(A_{Lu} + A_{Gd})\} \leq 0.015 \qquad (1B),$$

and more preferably satisfies the condition specified by the following inequality (1C):

$$0.0075 \leq \{A^{Ce}/(A_{Lu} + A_{Gd})\} \leq 0.015 \qquad (1C).$$

Also, if the crystal structure of the inorganic scintillator belongs to monoclinic crystals of the space group C2/c, the scintillation rise time upon absorption of radiation will tend to be significantly shorter than if it belongs to the space group P2$_1$/c. In addition, a monoclinic crystal inorganic scintillator will more reliably exhibit excellent scintillation properties.

Through the present specification, "radiation" refers to particle rays (α rays, β rays, γ rays, X-rays, etc.) having sufficient energy to ionize atoms or molecules.

Also, an inorganic scintillator according to a preferred embodiment of the invention has an absorption coefficient of no greater than 0.500 cm$^{-1}$ for light with a wavelength of 415 nm. A conventional inorganic scintillator having a Ce content ratio in the range specified by inequality (1A) has a low scintillation output and is therefore unsuitable for application to PET and the like. As a result of detailed investigation with the aim of increasing the scintillation output of such inorganic scintillators, the present inventors discovered that scintillation output can be sufficiently increased by heat treatment of an inorganic scintillator crystal.

In addition, upon researching differences in inorganic scintillators before and after heat treatment from the standpoint of their physical properties and structures, it was found that the absorption coefficients differ for light with a wavelength of 415 nm. Furthermore, it became clear that inorganic scintillators with the absorption coefficients of up to 0.500 cm$^{-1}$ exhibit sufficiently high scintillation output, and the present invention was thereupon completed.

The reason that inorganic scintillators with absorption coefficients of up to 0.500 cm$^{-1}$ for light with a wavelength of 415 nm exhibit sufficiently high scintillation output has not been elucidated in detail at the current time. However, the present inventors attribute this partly to tetravalent Ce (hereinafter, "Ce$^{4+}$") which may be present as lattice defects in the inorganic scintillator. When Ce is added as a luminescent center for an inorganic scintillator, normally trivalent Ce is considered to function as the luminescent center, whereas Ce$^{4+}$ does not readily contribute to luminescence. For this reason, presumably, it is necessary to reduce the Ce$^{4+}$ to increase the scintillation output of the inorganic scintillator.

At the current time, no method has been established for direct quantitation of the Ce$^{4+}$ content ratio in inorganic scintillators. However, the present inventors expect that the Ce$^{4+}$ content ratio can be indirectly measured by measuring the absorption coefficient for light with a wavelength of 415 nm. A larger absorption coefficient should mean a higher Ce$^{4+}$ content ratio.

The inorganic scintillator of this embodiment preferably satisfies the condition specified by the following inequality (2A), and more preferably satisfies the condition specified by the following inequality (2B).

$$0.10 \leq \{A_{Lu}/(A_{Lu}+A_{Gd})\} \leq 0.50 \quad (2A)$$

$$0.15 \leq \{A_{Lu}/(A_{Lu}+A_{Gd})\} \leq 0.30 \quad (2B)$$

Lu includes its radioactive isotope $^{176}$Lu at approximately 2.6% as the natural abundance ratio, and the natural radiation of beta decay is a cause of noise when this element is used as a scintillator. From this viewpoint, therefore, a lower Lu content ratio in the inorganic scintillator is preferred, and preferably $\{A_{Lu}/(A_{Lu}+A_{Gd})\}$ is no greater than 0.50. On the other hand, if $\{A_{Lu}/(A_{Lu}+A_{Gd})\}$ is less than 0.10, it will be difficult to obtain a crystal belonging to monoclinic crystals of the space group C2/c, as the crystal will instead tend to belong to the space group P2$_1$/c. An inorganic scintillator composed of a crystal belonging to the space group P2$_1$/c exhibits a longer scintillation rise time upon absorption of radiation compared to a crystal belonging to monoclinic crystals of the space group C2/c, while also tending to have a significantly lower time resolution. Thus, when an inorganic scintillator satisfying the condition represented by inequality (2A) above is used for PET or the like, it will tend to allow more precise and accurate detection of information relating to radiation from a specimen.

A preferred mode of a process for fabrication of an inorganic scintillator according to the invention (an example of a fabrication process for obtaining a rare earth silicate single crystal as a single crystal of a metal oxide) will now be explained.

The fabrication process for an inorganic scintillator of this mode is a fabrication process for an inorganic scintillator according to the preferred mode of the invention described above, and specifically it comprises a growth step in which a single crystal ingot for construction of the inorganic scintillator is obtained by a single crystal growth method, a heating step in which the ingot is heated, a cooling step in which the heated ingot is cooled, and a cutting step in which the cooled ingot is cut to a prescribed shape and size to obtain an inorganic scintillator.

Of these steps, the growth step includes a melting step in which the raw material for the inorganic scintillator is brought to a molten state by a melting method to obtain a melt, and a crystal growth step in which at least a portion of a seed crystal is dipped in the melt to solidify the portion of the melt surrounding the seed crystal, to grow the crystal along a prescribed crystal plane of the seed crystal and obtain a single crystal ingot.

From the standpoint of more reliably obtaining an inorganic scintillator according to this mode, the single crystal growth method including the aforementioned melting method is preferably a Czochralski process. In this case, a lifting apparatus 10 having the construction shown in FIG. 3 described hereunder is preferably used for the operation in the melting step and crystal growth step.

Figure 3:
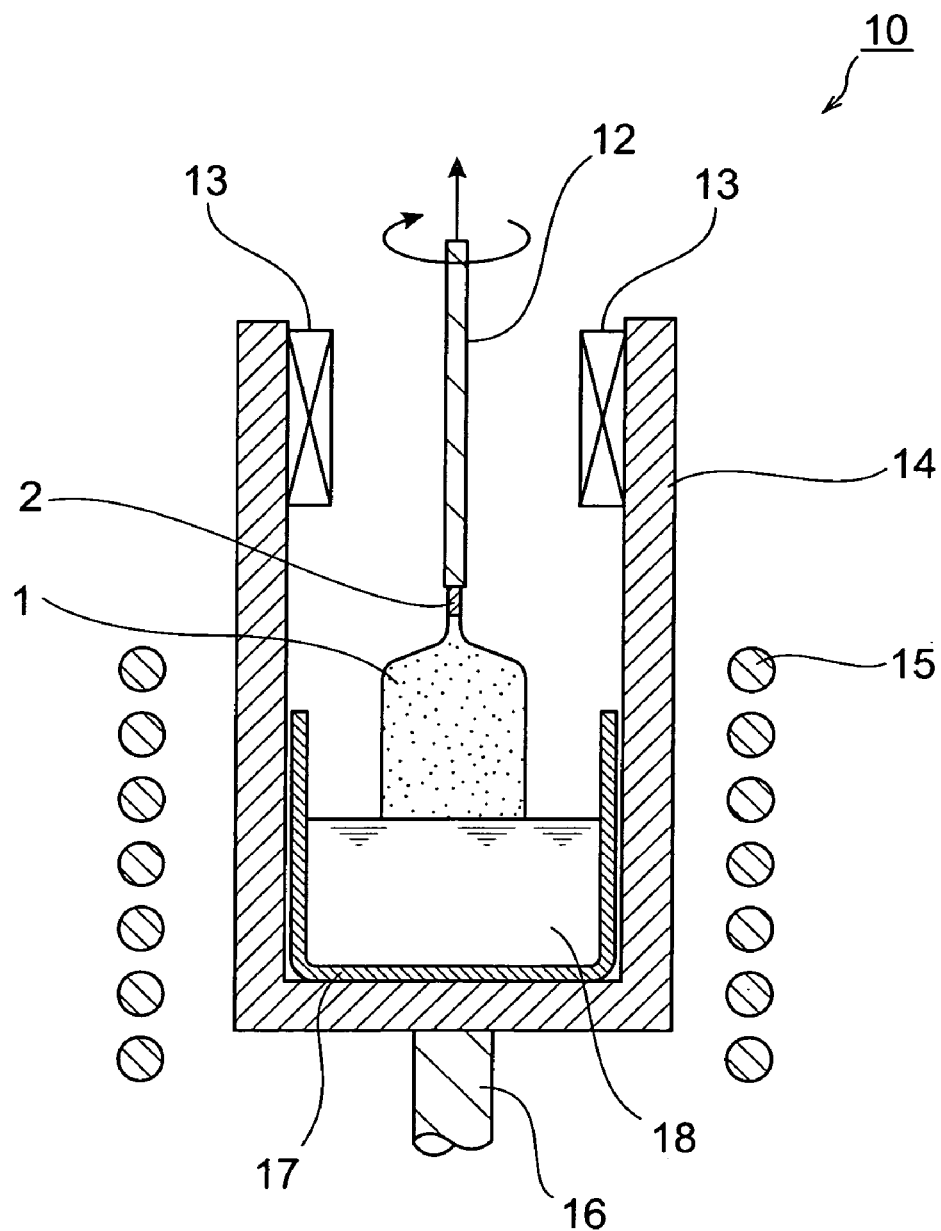
FIG. 3 is a schematic cross-sectional view showing an example of the basic construction of an apparatus for fabrication of an inorganic scintillator of the invention.

FIG. 3 is a schematic cross-sectional diagram showing an example of the basic construction of an apparatus for fabrication of an inorganic scintillator according to this mode.

The lifting apparatus 10 shown in FIG. 3 has a high-frequency induction heating furnace (two-zone hot growth furnace) 14. The high-frequency induction heating furnace 14 is used for continuous operation in the melting step and the cooling (solidification) step described above.

The high-frequency induction heating furnace 14 is a refractory closed-bottom container with a cylindrical wall, and the shape of the closed-bottom container is the same as one used for single crystal production based on the publicly known Czochralski process. A high-frequency induction coil 15 is wound on the outside of the bottom of the high-frequency induction heating furnace 14. Also, a crucible 17 (for example, a crucible made of Ir (iridium)) is set on the bottom inside the high-frequency induction heating furnace 14. The crucible 17 also serves as a high-frequency induction heater. The starting material for the inorganic scintillator is loaded into the crucible 17, and application of high-frequency induction to the high-frequency induction coil 15 heats the crucible 17 and produces a melt 18 composed of the constituent material of the inorganic scintillator.

A heater 13 (resistance heater) is also set at the top inner wall without contacting the melt 18 in the high-frequency induction heating furnace 14. This heater allows independent control of the heating output with respect to the high-frequency induction coil 15.

At the center bottom of the high-frequency induction heating furnace 14 there is provided an opening (not shown) which passes from the inside to the outside of the high-frequency induction heating furnace 14. Through this opening there is inserted a crucible support rod 16, from the outside of the high-frequency induction heating furnace 14, and the tip of the crucible support rod 16 is connected to the bottom of the crucible 17. Rotating the crucible support rod 16 allows the crucible 17 to be rotated in the high-frequency induction heating furnace 14. The area between the opening and the crucible support rod 16 is sealed with packing or the like.

A more specific fabrication method using a lifting apparatus 10 will now be explained.

First in the melting step, the starting material for the single crystal of the inorganic scintillator is loaded into the crucible 17, and application of high-frequency induction to the high-frequency induction coil 15 produces a melt 18 composed of the constituent material of the inorganic scintillator. The starting material for the single crystal may be, for example, a simple oxide of a rare earth element or Si which is to compose the single crystal.

Next, in the crystal growth step, a portion of the melt is solidified to obtain a single crystal ingot 1 for a cylindrical inorganic scintillator. More specifically, a lifting rod 12 having the seed crystal 2 anchored to the lower end is first dipped into the melt 18 from the top of the high-frequency induction heating furnace 14. Next, the lifting rod 12 is raised while crystallizing the melt surrounding the seed crystal 2 for growth of the crystal to form the inorganic scintillator single crystal ingot 1. The heating output from the heater 13 is adjusted at this time so that the inorganic scintillator single crystal ingot 1 raised from the melt 18 grows to have a cross-section with the prescribed diameter.

From the viewpoint of more reliably obtaining a single crystal belonging to monoclinic crystals of the space group C2/c, the seed crystal serving as the nucleus of the single crystal ingot 1 is preferably a single crystal belonging to monoclinic crystals of the space group C2/c. Specifically, the single crystal is more preferably a rare earth silicate single crystal, and even more preferably one comprising Lu and/or Gd as the rare earth element. In particular, using a seed crystal which is a single crystal composed of a rare earth silicate including both Lu and Gd will permit more reliable fabrication of the inorganic scintillator. Also, in order to achieve prescribed content ratios for each of the elements in the single crystal ingot, it is preferred for the content ratios of each of the elements in the single crystal to be adjusted to those prescribed content ratios.

In the heating step following the growth step described above, the melt 18 and the single crystal ingot 1 are separated and the area surrounding the single crystal ingot 1 in the high-frequency induction heating furnace 14 is filled by an inert gas atmosphere adjusted so as to contain as little oxygen as possible. At the same time, or before or after this step, the heat output of the heater is regulated in order to set the temperature surrounding the single crystal ingot 1 in the high-frequency induction heating furnace 14 (heating temperature) to a prescribed temperature, and the single crystal ingot 1 is subjected to the heat treatment for a prescribed period of time while maintaining this heating temperature approximately constant.

Since the heating conditions such as the oxygen partial pressure and heating temperature of the atmosphere surrounding the single crystal ingot 1 must be adjusted depending on the size of the single crystal ingot 1, the constituent elements and other factors, it is difficult to generalize for all cases. However, the heating conditions may be regulated and established so that the inorganic single crystal scintillator finally obtained after the cutting step described hereunder has an absorption coefficient of no greater than 0.500 cm$^{-1}$ for light with a wavelength of 415 nm. For example, experience teaches that the oxygen partial pressure is preferably in the range of 0.1-1.0 vol % as the oxygen concentration in a furnace at approximately atmospheric pressure, and the heating temperature is preferably 1500-1920° C.

The heating time may also be adjusted so that the inorganic single crystal scintillator has an absorption coefficient of no greater than 0.500 cm$^{-1}$, and experience teaches that it is preferably 2 hours or longer, more preferably 10 hours or longer and most preferably 24 hours or longer.

Next, in the cooling step, the heating output of the heater is adjusted for cooling of the grown single crystal ingot 1 obtained after the heating step. From the viewpoint of adequately preventing cracks in the single crystal and more reliably producing a single crystal for the inorganic scintillator, the atmosphere in the high-frequency induction heating furnace 14 during the operation of the melting step and cooling (solidification) step is preferably composed of a mixed gas whose major component is an inert gas satisfying the condition represented by the following inequality (9).

$$100 \times \{G/(E+G)\} \leq 2.0 \ (\%) \tag{9}$$

In formula (9), E represents the partial pressure of the inert gas in the mixed gas, and G represents the partial pressure of the oxygen gas in the mixed gas. According to the invention, "inert gas" means a noble gas or nitrogen.

If the value of $\{G/(E+G)\}$ exceeds 2.0%, more coloration will be produced in the crystal, tending to lower the scintillator performance. If the value of $\{G/(E+G)\}$ exceeds 4.0%, and Ir is used as the constituent material of the crucible, vaporization of the structural material will proceed vigorously, hampering growth of the crystal.

Next, in the cutting step after the heating step, the single crystal ingot 1 for the inorganic scintillator is cut to the prescribed shape and size to obtain an inorganic scintillator single crystal.

The above detailed explanation of a preferred mode of the invention is not intended to restrict the scope of the invention to this particular mode. For example, the inorganic scintillator of the invention may be polycrystalline in its solid state. If the inorganic scintillator of the invention is polycrystalline, it may be obtained by a sol-gel production process in the same manner as conventional polycrystalline scintillators.

The fabrication process for obtaining an inorganic scintillator of the invention may also comprise, in addition to or in place of the aforementioned heating step, an impurity element addition step in which a trace amount of a specific impurity element is added to the single crystal. Here, a "specific impurity element" is an element other than Lu, Gd, Ce or Si composing the inorganic scintillator, and as examples there may be mentioned Al, Ta, Zr, Hf and Ca.

The content ratio of the specific impurity element in the inorganic scintillator may be adjusted and established so that the inorganic scintillator has an absorption coefficient of no greater than 0.500 cm$^{-1}$ for light with a wavelength of 415 nm. For example, when Al is used as the specific impurity element, the content ratio in the inorganic scintillator is preferably 0.001-0.00001 based on 1 as the number of all the elements composing the single crystal.

The impurity element addition step is preferably carried out by loading a substance serving as the supply source for the specific impurity element into the crucible at the same time the starting material for the inorganic scintillator single crystal is loaded into the crucible. The supply source for the specific impurity element may be an oxide of the impurity element.

EXAMPLES

The present invention will now be explained in greater detail through the following examples, with the understanding that these examples are in no way limitative on the invention.

Example 1

In an Ir crucible having the same shape shown in FIG. 3 with a diameter of 50 mm, a height of 50 mm and a thickness of 1.5 mm there were loaded 300.05 g of gadolinium oxide ($Gd_2O_3$, 99.99 wt % purity), 83.39 g of lutetium oxide ($Lu_2O_3$, 99.99 wt % purity), 62.95 g of silicon dioxide ($SiO_2$, 99.99 wt % purity) and 3.61 g of cerium oxide ($CeO_2$, 99.99 wt % purity) as the starting materials, and 450.00 g of the mixture was obtained. The crucible was then placed at a prescribed position in a high-frequency induction heating furnace and the mixture was heated to melting at 1950° C. or higher to obtain a melt (chemical composition of melt: $Ce_{0.02}Lu_{0.4}Gd_{1.598}SiO_5$).

Next, the end of the lifting rod to which the seed crystal was anchored was placed in the melt for crystal growth. The seed crystal used was a cut-out single crystal composed of metal oxides including Lu, Gd, Ce and Si obtained by an ordinary crystal growth method. After growth of the single crystal and before its cutting (trimming), the crystal structure was confirmed to be a single crystal belonging to monoclinic crystals of the space group C2/c, using a powder X-ray diffraction apparatus (RAD™, product of Rigaku Corp.).

Next, a single crystal ingot with a neck diameter of 8 mmϕ was lifted at a lifting speed of 3-10 mm/h to form a neck section. The cone section (cylinder trunk) was then lifted, initiating lifting of the cylinder trunk when the diameter reached 25 mmϕ (growth step). The atmosphere in the furnace at this time was regulated by adjusting the nitrogen inflow and oxygen inflow into the furnace for an oxygen concentration of 0.5 vol %.

After growing the cylinder trunk, the single crystal ingot was cut off from the melt. The atmosphere in the furnace was then adjusted to an atmosphere with a lower oxygen partial pressure than during single crystal growth (containing virtually no oxygen), and the temperature in the furnace was set to 1900° C. The single crystal ingot was subjected to heat treatment for 24 hours while maintaining a constant 1900° C. temperature in the furnace (heating step).

The single crystal ingot was then cooled while lowering the temperature in the furnace at a rate of 50° C./hr with the atmosphere in the furnace being kept in the same state as during the heating step (cooling step). After cooling was complete, the obtained single crystal was taken out. The obtained single crystal ingot had a crystal mass of about 400 g.

Next, part of the bottom of the obtained single crystal was cut out and worked into powder. The resulting powder was combined with a silicon powder standard sample and the crystal structure was identified using a powder X-ray diffraction apparatus (RAD, product of Rigaku Corp.). This confirmed that the single crystal of Example 1 belonged to the space group C2/c.

Next, an approximately cuboid sample (inorganic scintillator single crystal) with a size of 4 mm×6 mm×20 mm was cut out from the obtained single crystal ingot (cutting step). An inner perimeter cutter was used for the cutting, and the blade of the inner perimeter cutter was a blade electrodeposited with #325-400 natural diamond.

[Derivation of Absorption Coefficient]

Two 6 mm×20 mm sides of the six sides of the sample (rough cuboid) were mechanically polished. Also, one of the 6 mm×20 mm sides of the single crystal after mechanical polishing was irradiated with light of a wavelength of 415 nm from an approximately normal direction using a deuterium lamp (50 W), and the quantity of light emitted from the opposite side was detected to determine the transmittance $I_{ex}$ (%). The transmittance was measured using a spectrophotometer (U-3310 by Hitachi High-Technologies).

The refractive index in air was 1.00 for light with a wavelength of 415 nm, and since the refractive index of the single crystal is 1.85 for the same light wavelength (from M. Kobayashi and M. Ishii, "Phosphor Handbook", CRC Press, 1997, Chap. 7), the reflectance R according to equation (4) above is 0.0888. The reflectance R was entered into formula (7) above to determine $I_r$, and then $I_{ex}$, $I_r$ and x (x=0.4 cm) were entered into formula (8) above to calculate the absorption coefficient μ. The results are shown in Table 1.

[Measurement of Scintillation Output and Scintillation Decay Time]

Polytetrafluoroethylene (PTFE) tape was covered as a reflective material onto five of the six sides of the (roughly cuboid) sample, excluding one of the sides with a size of 4 mm×6 mm. The sample was then placed with the radiation incident side lacking the PTFE tape covering positioned facing the photomultiplier side (photoelectric conversion side) of a photomultiplier tube (H1949) by Hamamatsu Photonics and fixed using optical grease, to obtain an inorganic scintillator.

Each sample was irradiated with 611 KeV radiation using $^{137}Cs$, and the time-dependent change in scintillation output was measured using a digital oscilloscope (TDS3052) by Techtronics. The scintillation output and two different scintillation decay times (τ1 and τ2) were determined from the resulting scintillation output time-dependent change curve by the method described above. The scintillation output was determined as a relative value with respect to 1.0 as the scintillation output obtained by measurement in the same manner for an inorganic scintillator made of a BGO single crystal. The results are shown in Table 1.

TABLE 1

|  |  | Example 1 | Comparative Example 1 |
|---|---|---|---|
| Absorption coefficient ($cm^{-1}$) |  | 0.194 | 1.719 |
| Scintillation output |  | 4.0 | 1.6 |
| Scintillation | τ1 | 140 | 110 |
| decay time (ns) | τ2 | 65 | 50 |

Comparative Example 1

A roughly cuboid sample (inorganic scintillator single crystal) was cut out in the same manner as Example 1 from a single crystal ingot obtained in the same manner as Example 1, except that no heating step was carried out. The obtained sample was used for derivation of the absorption coefficient and measurement of the scintillation output and scintillation decay time in the same manner as Example 1. The value used for the refractive index of the single crystal was the same as in Example 1. The results are shown in Table 1.

According to the invention, it is possible to provide an inorganic scintillator having a structure wherein Ce is added as a luminescent center to a matrix material made of a Gd-containing metal oxide, wherein the inorganic scintillator has a sufficiently high scintillation output with a sufficiently short scintillation decay time, and to provide a process for its fabrication.

The inorganic scintillator of the invention can be utilized as a scintillator for mounting in a PET apparatus or as a scintillator for high-energy physics research.

What is claimed is:

1. An inorganic scintillator capable of producing scintillation by radiation, characterized by being a crystal comprising metal oxides including Lu, Gd, Ce and Si, by satisfying the condition specified by the following inequality:

$$0.005 \leq \{A_{Ce}/(A_{Lu}+A_{Gd})\} \leq 0.025,$$

(wherein $A_{Lu}$ represents the number of Lu atoms in the crystal, $A_{Gd}$ represents the number of Gd atoms in the crystal, and $A_{Ce}$ represents the number of Ce atoms in the crystal), and by having an absorption coefficient of no greater than 0.500 cm$^{-1}$ for light with a wavelength of 415 nm.

2. An inorganic scintillator according to claim 1, which satisfies the condition specified by the following inequality (1B):

$$0.005 \leq \{A_{Ce}/(A_{Lu}+A_{Gd})\} \leq 0.015 \quad (1B).$$

3. An inorganic scintillator according to claim 1, which is a crystal belonging to monoclinic crystals of the space group C2/c.

4. An inorganic scintillator according to claim 1, which satisfies the condition specified by the following inequality (2A):

$$0.10\{A_{Lu}/(A_{Lu}+A_{Gd})\} \leq 0.50 \quad (2A).$$

5. An inorganic scintillator according to claim 1, which is a single crystal.

6. A process for fabrication of an inorganic scintillator according to claim 5, comprising steps of:

growing a crystal by a single crystal growth method to obtain a single crystal ingot for construction of said inorganic scintillator, and thereafter heating said signal crystal ingot, wherein the oxygen partial pressure of the surrounding atmosphere of said ingot is adjusted in said heating step so that the absorption coefficient of said single crystal is no greater than 0.500 cm$^{-1}$ for light with a wavelength of 415 nm.

7. A process for fabrication of an inorganic scintillator according to claim 6, wherein the ambient temperature of said ingot is adjusted in said heating step so that the absorption coefficient of said single crystal is no greater than 0.500 cm$^{-1}$ for light with a wavelength of 415 nm.

8. A process for fabrication of an inorganic scintillator according to claim 6, wherein the heating time of said ingot in said heating step is adjusted so that the absorption coefficient of said single crystal is no greater than 0.500 cm$^{-1}$ for light with a wavelength of 415 nm.

9. A process for fabrication of an inorganic scintillator according to claim 6, which further comprises a step of cooling said ingot after said heating step.

10. A process for fabrication of an inorganic scintillator according to claim 9, which further comprises a step of cutting said ingot to a prescribed shape and size after said cooling step to obtain an inorganic scintillator.

11. A process for fabrication of an inorganic scintillator according to claim 6, wherein during said heating step, heating temperature of said atmosphere is also adjusted such that said inorganic scintillator has said absorption coefficient.

12. A process for fabrication of an inorganic scintillator according to claim 6, wherein said oxygen partial pressure is adjusted to be in a range of 0.1-1.0 vol %, and a heating temperature of said atmosphere during said heating step is 1500°-1920° C.

13. An inorganic scintillator according to claim 1, which satisfies the condition specified by the following inequality (1C):

$$0.0075 \leq \{A_{Ce}/(A_{Lu}+A_{Gd})\} \leq 0.30.$$

14. An inorganic scintillator according to claim 1, which satisfies the condition specified by the following inequality (2B):

$$0.15 \leq \{A_{Lu}/(A_{Lu}+A_{Gd})\} \leq 0.30.$$

15. An inorganic scintillator capable of producing scintillation by radiation, being produced by a process comprising steps of:

growing a crystal by a single crystal growth method to obtain a single crystal ingot, and thereafter heating the single crystal ingot, wherein the inorganic scintillator is a crystal comprising metal oxides including Lu, Gd, Ce and Si, satisfies the condition specified by the following inequality (1A):

$$0.005 \leq \{A_{Ce}/(A_{Lu}+A_{Gd})\} \leq 0.025 \quad (1A),$$

(wherein $A_{Lu}$ represents the number of Lu atoms in the crystal, $A_{Gd}$ represents the number of Gd atoms in the crystal, and $A_{Ce}$ represents the number of Ce atoms in the crystal), and has an absorption coefficient of no greater than 0.500 cm$^{-1}$ for light with a wavelength of 415 nm.

16. An inorganic scintillator according to claim 15, wherein heating temperature in the heating step is 1500-1920° C., and oxygen concentration in surrounding atmosphere of the ingot is 0.1-1.0 vol % during the heating step.

* * * * *